(12) United States Patent
Smith et al.

(10) Patent No.: US 10,118,195 B2
(45) Date of Patent: Nov. 6, 2018

(54) METHODS FOR DEPOSITING A TRANSPARENT THIN FILM ONTO SUBSTRATES USING AN ATMOSPHERIC PLASMA GENERATING DEVICE

(71) Applicant: THE BOEING COMPANY, Chicago, IL (US)

(72) Inventors: Charles A. Smith, Fountain Valley, CA (US); Thai H. Sweitzer, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 216 days.

(21) Appl. No.: 15/071,760

(22) Filed: Mar. 16, 2016

(65) Prior Publication Data

US 2017/0266692 A1 Sep. 21, 2017

(51) Int. Cl.
| | |
|---|---|
| *C23C 16/50* | (2006.01) |
| *B05D 3/14* | (2006.01) |
| *B05C 5/02* | (2006.01) |
| *C09D 183/04* | (2006.01) |

(52) U.S. Cl.
CPC ............. *B05D 3/141* (2013.01); *B05C 5/02* (2013.01); *C09D 183/04* (2013.01)

(58) Field of Classification Search
CPC ..... C23C 16/50; C23C 16/401; C23C 16/402; H05H 1/24
See application file for complete search history.

(56) References Cited

U.S. PATENT DOCUMENTS

| | | | |
|---|---|---|---|
| 7,084,079 B2 | 8/2006 | Conti et al. | |
| 8,802,236 B2 | 8/2014 | Larson-Smith et al. | |
| 9,145,602 B2 | 9/2015 | Matos et al. | |
| 2004/0044127 A1* | 3/2004 | Okubo | C08J 5/18 525/54.3 |
| 2006/0239902 A1* | 10/2006 | Kimura | C01B 13/32 423/594.17 |
| 2009/0081472 A1* | 3/2009 | Watanabe | G02B 1/111 428/457 |
| 2013/0216859 A1* | 8/2013 | Kuhlmann | B32B 17/10018 428/623 |
| 2014/0141257 A1 | 5/2014 | Ranade et al. | |
| 2014/0141264 A1 | 5/2014 | Ranade et al. | |
| 2015/0340641 A1* | 11/2015 | Kuroki | C07D 405/14 257/40 |
| 2016/0049226 A1 | 2/2016 | Ranade et al. | |
| 2016/0091635 A1* | 3/2016 | Ibuki | G02B 1/118 15/209.1 |

OTHER PUBLICATIONS

Schutze, Andreas, et al., "The Atmospheric-Pressure Plasma Jet: A Review and Comparison to Other Plasma Sources". IEEE Transactions on Plasma Science, vol. 26, No. 6, Dec. 1998, pp. 1685-1694.*

(Continued)

*Primary Examiner* — Bret P Chen
(74) *Attorney, Agent, or Firm* — Coats & Bennett, PLLC (57) ABSTRACT

Methods are disclosed for delivering a substantially homogeneous and substantially transparent single film coating comprising siloxane-containing precursor materials onto a substantially transparent substrate surface on large components via atmospheric pressure plasma deposition techniques.

7 Claims, 10 Drawing Sheets

(56) References Cited

OTHER PUBLICATIONS

Winter, J., et al., "Atmospheric pressure plasma jets: an overview of devices and new directions". Plasma Sources Sci. Technol. 24 (2015) 064001 (19pp).*

Thyen, R., et al., "Plasma-enhanced chemical-vapour-deposition of thin films by corona discharge at atmospheric pressure." Surface & Coatings Technology 97 (1997) 426-434.*

Maryam Moravej and Robert F. Hicks; article entitled Atmospheric Plasma Deposition of Coatings Using a Capacitive Discharge Source; Chem. Vap. Depositions 2005, 11, 469-476 Mar. 11, 2005.

J. Benedikt, R. Reuter, D. Ellerweg, K. Rugner, A. Von Keudelli; article entitled Deposition of SiOx Films by Means of Atmospheric Pressure Microplasma Jets; Research Department Plasmas with Complex Interactions, May 13, 2011.

Grunwald, H., et al., "Better aluminium mirrors by integrating plama pretreatment, sputtering, and plasma polymerization for large-scale car headlight production," Current Industrial Practice, Surface and Coatings Technology 111, Sep. 25, 1998, Elsevier, pp. 287-296.

* cited by examiner

FIG.8

METHODS FOR DEPOSITING A TRANSPARENT THIN FILM ONTO SUBSTRATES USING AN ATMOSPHERIC PLASMA GENERATING DEVICE

TECHNOLOGICAL FIELD

The present disclosure generally relates to the field of atmospheric plasma coating. More particularly, the present disclosure relates to the field of applying thin film transparent coatings to large transparent surfaces using atmospheric pressure plasma methods and apparatuses.

BACKGROUND

Plastics are becoming increasingly useful substitutes for heavier materials in industry and manufacturing. In industries where weight, or weight reduction is critical, plastics can offer solutions to certain desired results in terms of improving a product's overall performance. When a substrate material must be transparent, such as, for example windows or windshields, glass windows and windshields, though heavier and more expensive, remain the benchmark material in terms of transmissivity and strength. Nevertheless, there is a movement to substitute polymeric materials, such as acrylic or polycarbonate materials, etc. for glass materials to reduce weight and assist objects such as vehicles to meet various fuel consumption and other performance standards, etc.

Many polymeric materials, such as, for example acrylic materials, can be made to be adequately transparent. However such materials are softer than glass and can be susceptible to scratches, abrasions and erosion through use, especially when used in high speed environments. Such surface abrasions can lead to crazing when operational stresses are applied to components such as windows and windshields used in vehicles including, for example, aircraft.

Coatings deposited onto various transparent polymeric component substrates are often desirable for expanding the usefulness of substrates having certain desirable physical or chemical characteristics (e.g. low cost, transparency, etc.); especially if the component substrates do not possess adequate strength, durability, scratch resistance, hardness, etc. Applying a coating to such substrates, therefore, may allow one to achieve desired characteristics, especially surface characteristics of transparent components.

Plasma deposition systems able to deliver very thin film coatings to substrate surfaces are known. Vacuum deposition refers to a family of related procedures used to deposit layers of material on an atom-by-atom or molecule-by-molecule basis onto a substrate surface. Such procedures, as their name suggests, operate at pressures well below atmospheric pressure (i.e. under vacuum). The deposited layers or thin film coatings can be deposited at thicknesses of from one atom up to millimeters. Since such processes must be conducted under vacuum, the vacuum chamber must be large enough to contain components being coated. Therefore, plasma deposition is practically restricted to components that are small enough to be placed within a vacuum chamber or low pressure environment. Put another way, the limiting factor in a vacuum plasma deposition process is often the size of vacuum chamber.

Atmospheric plasma deposition refers to a plasma deposition process that is conducted at ambient pressure. Therefore, such atmospheric plasma deposition processes do not require a vacuum chamber within which to deposit a coating onto a substrate. Since no vacuum is required or involved, such atmospheric plasma deposition processes can offer greater processing flexibility for coating processes.

Atmospheric plasma deposition processes for depositing differing, thin coatings onto substrates are known, whereby multiple layers of various and differing coatings are deposited onto a substrate to impart various characteristics onto a substrate Siloxane-containing thin film coatings are known in the manufacture of substrates, including transparent materials used for windshields and windows. Transparent polymeric substrate materials are desirable over glass for use in vehicular windshields and windows in terms of weight, cost, safety, etc. However, since non-glass transparent materials often suffer in terms of erosion, abrasion, etc., this lack of material durability impacts repair and replacement schedules, as vehicles must be taken out of service to repair and replace.

Various coating layers have been attempted to provide adequate strength and characteristics to substrates, including transparent substrates. However, the complexity of delivering numerous coating layers or varying thicknesses, with each coating having desired characteristics to improve or preserve the characteristics and usefulness of substrate materials has led to uneven and costly performance in the field.

BRIEF SUMMARY

The present disclosure relates to methods, systems and apparatuses for delivering coatings to transparent surfaces on large components using atmospheric pressure plasma coating apparatuses, methods and systems. The present disclosure further relates to substrates coated according to such atmospheric pressure plasma coating methods, as well as components and finished products comprising substrates coated according to methods disclosed herein.

According to one aspect of the disclosure, methods are disclosed for depositing a thin film onto a transparent substrate, the method comprising: positioning an atmospheric pressure plasma generating device proximate to a substrate; delivering a carrier material to the atmospheric pressure plasma generating device; generating a plasma in the atmospheric pressure plasma generating device; delivering a plurality of precursor materials to the atmospheric pressure plasma generating device; controlling the flow of the precursor materials to the atmospheric pressure plasma generating device; and depositing a substantially homogeneous and substantially transparent single layer thin film coating onto the substrate.

In a further aspect, in the step of delivering a plurality of precursor materials to the atmospheric pressure plasma generating device, the plurality of precursor materials delivered to the plasma are delivered to the plasma substantially simultaneously.

In another aspect, in the step of delivering a plurality of precursor materials to the atmospheric pressure plasma generating device, the plurality of precursor materials delivered comprises a first precursor material and a second precursor material, with said first precursor material and said second precursor material delivered independently from one another to the atmospheric pressure plasma generating device.

In a further aspect, in the step of delivering a carrier material to the atmospheric pressure plasma generating device, the carrier material delivered comprises helium, argon, oxygen, nitrogen or combinations thereof.

In a still further aspect, in the step of delivering a plurality of precursor materials to the atmospheric pressure plasma generating device, the precursor materials delivered comprise siloxane-containing materials.

In yet another aspect, in the step of delivering a plurality of precursor materials to the atmospheric pressure plasma generating device, the precursor materials delivered comprise a material including: hexamethyldisiloxane; diethoxydiethylsilane; glycidoxypropyl trimethoxysilane; tetraethoxysilane; triethoxyvinylsilane; hexamethyltrisiloxane; octamethylcyclotetrasiloxane (OMCTS); tetramethylcyclotetrasiloxane (TMCTS); hexamethyldisilane; hexamethyldisilazane; methyltriethoxysilane; vinyltris(2-methoxyethoxyl)-silane; allyltriethoxysilane; (3-glycidoxypropyl)-trimethoxysilane; acrylate-containing compounds, copolymers thereof, and combinations thereof.

According to another aspect, in the step of delivering a plurality of precursor materials to the atmospheric pressure plasma generating device, the delivered precursor materials comprise: octamethylcyclotetrasiloxane and tetramethylcyclotetrasiloxane.

According to another aspect, a coating for a substantially transparent substrate deposited onto a substantially transparent thin film is made according to a method comprising depositing a thin film onto a substantially transparent substrate by positioning an atmospheric pressure plasma generating device proximate to a substrate; delivering a carrier material to the atmospheric pressure plasma generating device; generating a plasma in the atmospheric pressure plasma generating device; delivering a plurality of precursor materials to the atmospheric pressure plasma generating device; controlling the flow of the precursor materials to the atmospheric pressure plasma generating device; and depositing a substantially homogeneous and a substantially transparent single layer coating onto the substrate.

According to another aspect, a coating for a substantially transparent substrate deposited onto a substantially transparent thin film is made according to a method comprising depositing a thin film onto a substantially transparent substrate by positioning an atmospheric pressure plasma generating device proximate to a substrate; delivering a carrier material to the atmospheric pressure plasma generating device; generating a plasma in the atmospheric pressure plasma generating device; delivering a plurality of precursor materials to the atmospheric pressure plasma generating device; controlling the flow of the precursor materials to the atmospheric pressure plasma generating device; and depositing a substantially homogeneous and a substantially transparent single layer coating onto the substrate wherein, in the step of delivering a plurality of precursor materials to the atmospheric pressure plasma generating device, wherein the precursor materials delivered comprise a material selected from the group consisting of: hexamethyldisiloxane; diethoxydiethylsilane; glycidoxypropyl trimethoxysilane; tetraethoxysilane; triethoxyvinylsilane; hexamethyltrisiloxane; octamethylcyclotetrasiloxane; tetramethylcyclotetrasiloxane; hexamethyldisilane; hexamethyldisilazane; methyltriethoxysilane; methyltrimethoxysilane; tetraethylorthosilane; 3-mercaptopropylytriethoxysilane; vinyltris(2-methoxyethoxyl)-silane; allyltriethoxysilane; (3-glycidoxypropyl)-trimethoxysilane; acrylate-containing compounds, copolymers thereof, and combinations thereof.

According to another aspect, a coating for a substantially transparent substrate deposited onto a substantially transparent thin film is made according to a method comprising depositing a thin film onto a substantially transparent substrate by positioning an atmospheric pressure plasma generating device proximate to a substrate; delivering a carrier material to the atmospheric pressure plasma generating device; generating a plasma in the atmospheric pressure plasma generating device; delivering a plurality of precursor materials to the atmospheric pressure plasma generating device; controlling the flow of the precursor materials to the atmospheric pressure plasma generating device; and depositing a substantially homogeneous and a substantially transparent single layer coating onto the substrate wherein, in the step of delivering a plurality of precursor materials delivered to the atmospheric pressure plasma generating device, the precursor materials delivered comprise: octamethylcyclotetrasiloxane and tetramethylcyclotetrasiloxane.

A further aspect is directed to a plasma for use in the manufacture of a substantially transparent deposited thin film, said plasma comprising a carrier material and a radio-frequency discharge that produces excited species from the carrier. These excited species are carried to a second chamber where they react with the precursor materials in the carrier material in a gaseous state to form species that in turn form a transparent coating when deposited onto a substrate.

Yet another aspect is directed to an atmospheric pressure plasma generating device comprising: a first input configured to direct a flow of first precursor material from a first precursor material supply to the atmospheric pressure plasma generating device, and a second input configured to direct a flow of second precursor material from a second precursor material supply to the atmospheric pressure plasma generating device; wherein a substantially simultaneous flow of first precursor material and second precursor material are delivered to the atmospheric pressure plasma generating device.

According to a further aspect, the atmospheric pressure plasma generating device further comprises at least one controller, with the controller configured to control a first precursor material flow from a first precursor material supply to the first input and with the controller further configured to control a second precursor material flow from a second precursor material supply to the second input.

In a still further aspect, the first precursor material comprises octamethylcyclotetrasiloxane and the second precursor material comprises tetramethylcyclotetrasiloxane.

Another aspect is directed to a plasma for use in the manufacture of a substantially transparent deposited thin film, said plasma comprising: a carrier material; and a plurality of siloxane-containing precursor materials; wherein at least one input is configured to direct the precursor materials substantially simultaneously to the plasma; and wherein the thin film is substantially homogeneous.

In a further aspect, the plasma is generated in an atmospheric pressure plasma generating device.

In another aspect, the plurality of precursor materials is configured to contact the plasma in the afterglow region of an atmospheric pressure plasma generating device.

A further aspect is directed to a coating for a substantially transparent substrate, with the coating comprising a single layer, with the single layer comprising a plurality of siloxane-containing materials and wherein the single layer is substantially homogeneous.

In a further aspect, the coating is substantially transparent.

In another aspect, the siloxane-containing materials comprise octamethylcyclotetrasiloxane and tetramethylcyclotetrasiloxane.

A still further aspect is directed to an object comprising a coating, said coating comprising at least one layer, with the at least one layer comprising a plurality of siloxane-containing materials and wherein the single layer is substantially transparent.

Yet another aspect is directed to an object comprising a coating, said coating comprising at least one layer, with the at least one layer comprising a plurality of siloxane-containing materials and wherein the single layer is substantially homogeneous.

According to a further aspect, the object is a vehicle.

In yet another aspect, the vehicle may be a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface marine vehicle, an unmanned surface marine vehicle, a manned sub-surface marine vehicle, an unmanned sub-surface marine vehicle, and combinations thereof.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

Aspects of the present disclosure are directed to efficient and cost-effective coating processes for substrates used as component parts, particularly transparent substrates and substantially transparent substrates, whereby the coating processes are conducted at atmospheric pressure using modified atmospheric pressure plasma deposition techniques and modified atmospheric pressure plasma apparatuses.

According to the present specification, a "substantially transparent" material, component or substrate is defined for purposes of the present disclosure as a material, component or substrate having a refractive index ranging from about 1.4 to about 1.6. Ideally, any haze should not increase substantially due to the deposition of the coatings contemplated according to aspects of the present disclosure, and should remain below 2%. "Haze" is understood to be the measure of the amount of light scattered as light passes through a transparent substrate, and that interferes with visibility.

According to the present specification, atmospheric pressure is understood to be substantially equivalent to the ambient pressure of an environment. The average atmospheric pressure at sea level on Earth is defined by the International Standard Atmosphere as 101325 pascals (760.00 Torr; 14.6959 psi; 760.00 mm Hg, etc.). This is sometimes referred to as a unit of standard atmospheres (atm). Generally, atmospheric pressure is the total weight of the air above unit area at the point where the pressure is measured. Thus, air pressure varies with location (deviation in altitude from sea level, for example), and weather at "room temperature", which is understood to be a temperature ranging from about 60° F. to about 100° F. Further, according to the present specification "substantially ambient pressure" is defined as a naturally occurring pressure due to natural atmospheric conditions, varying accordingly to deviation from sea level and therefore having a value ranging from about 14 to about 16 psi.

According to one aspect, the present disclosure contemplates a method for depositing a thin transparent coating onto a transparent substrate surface using atmospheric pressure plasma deposition apparatuses and techniques. It has now been discovered that, by delivering and controlling the substantially simultaneous delivery of a plurality of precursor materials (e.g. precursor gases) to a plasma, significant improvements in the resulting deposited single transparent coating are provided to a substrate, for example, a transparent substrate.

In one aspect, a plasma is created in an atmospheric pressure plasma deposition device by directing a carrier material such as, for example, a carrier gas to the device. Contemplated carrier gases include argon, helium, oxygen, nitrogen, hydrogen, etc. alone or in combination.

In another aspect, useful precursor materials comprise siloxanes, including hexaethyldisiloxane; diethoxydiethylsilane; glycidoxypropyl trimethoxysilane; tetraethoxysilane; triethoxyvinylsilane; hexamethyltrisiloxane; octamethylcyclotetrasiloxane; tetramethylcyclotetrasiloxane; hexamethyldisilane; hexamethyldisilazane; methyltriethoxysilane; vinyltris(2-methoxyethoxyl)-silane; allyltriethoxysilane; (3-glycidoxypropyl)-trimethoxysilane; acrylate-containing compounds, copolymers thereof, and combinations thereof.

While the flow of a plurality of siloxane-containing precursor materials is delivered to the plasma substantially simultaneously, according to one aspect, the flow of each differing precursor material is delivered to the plasma separately; i.e. the precursors do not combine until they contact the plasma. According to aspects of the present disclosure, this separate delivery of desired precursor materials to the plasma can entail separate inlets to the atmospheric pressure plasma deposition device. In this way, a single layer film is deposited to a substrate offering significantly improved homogeneity and transparency, while imparting desired and pre-selected characteristics to a single layer film coating. A further desirable result is minimizing defects in coatings applied to transparent substrates via atmospheric pressure plasma deposition techniques.

Contemplated atmospheric pressure plasma generating devices that are to be modified according to aspects of this disclosure include, for example, apparatuses available from Surfx Technologies (Redondo Beach, Calif.) and Plasmatreat USA Inc. (Elgin, Ill.). According to an aspect of the present disclosure, such plasma devices may be positioned and employed to coat component parts prior to installation. In addition, such devices may be positioned and employed to coat completed structures, such as, for example, fully assembled aircraft or other vehicles such that repair can be effected by providing the necessary coating when a vehicle is taken out of service for repair or refitting. Therefore, it is understood that the contemplated atmospheric pressure plasma generating devices may be used in conjunction with robotic arms or other mechanized means for positioning, orienting, controlling, etc., the plasma generating device to deliver the desired coating to a substrate. Such contemplated mechanized means may be controlled manually or via remote and otherwise automated controls as would be understood by one skilled in the field of automated machinery and coating deposition.

Figure 1:
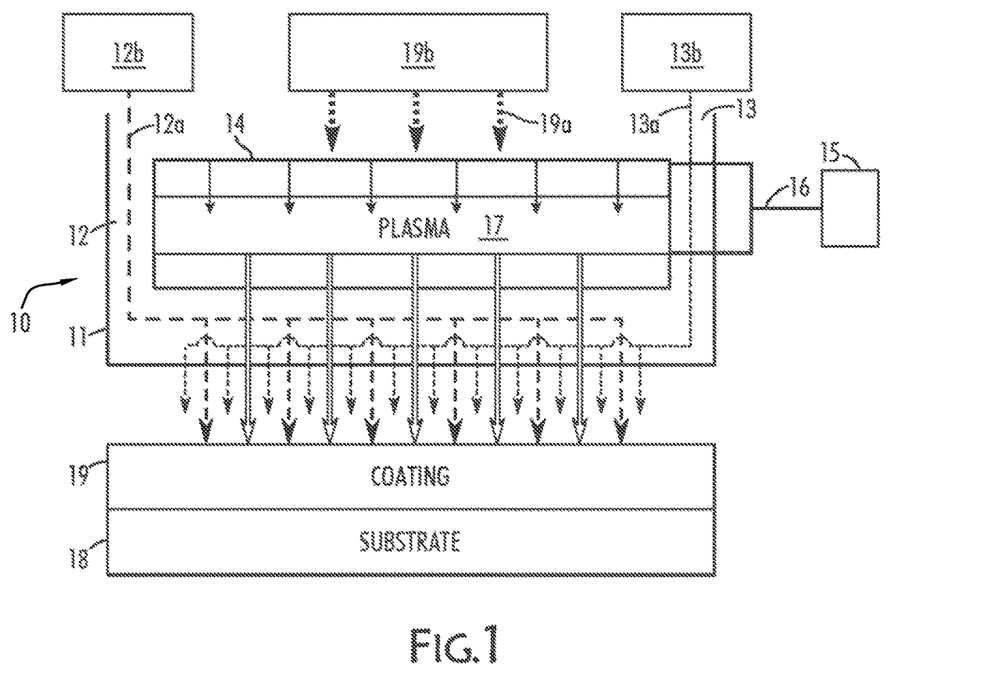
FIG. 1 is perspective view of an atmospheric pressure plasma deposition apparatus according to an aspect of the present disclosure.

FIG. 1 shows a schematic representation of an atmospheric pressure plasma deposition apparatus according to an aspect of the present disclosure. As shown in FIG. 1, an atmospheric pressure plasma deposition device 10 has an outer housing 11 configured to form precursor inlets 12, 13. Precursor inlets 12, 13 are in communication with plasma chamber 14. Carrier material 19a is introduced to plasma chamber 14 from a carrier material source 19b. Atmospheric pressure plasma deposition device 10 is in communication with a radio frequency power source 15 able to deliver the voltage, amperage and frequency necessary to apparatus 10 via power line 16 to generate plasma 17 in plasma chamber 14. FIG. 1 further shows a substrate 18 being coated by a deposited plasma coating 19 exiting apparatus 10 is deposited onto substrate 18.

In operation, carrier material 19a from a carrier material source 19b is introduced to plasma chamber 14. The plasma chamber 14 is heated to a desired operating temperature ranging from about 70° F. to about 150° F. The heated plasma gases produce a plasma 17. Substantially concurrently, precursor materials 12a, 13a are introduced from precursor material sources 12b, 13b to the plasma chamber 14 via corresponding separate precursor inlets 12, 13. In this way precursor materials 12a, 13a are commingled with the plasma 17 in the "afterglow" region of the plasma to effectively dope the plasma with precursor materials. The doped plasma exits the plasma chamber 14 and the doped plasma is directed to a substrate surface 18 for the purpose of depositing a coating 19 onto the substrate surface 18. By regulating, in a predetermined fashion, the flow of each precursor material into the afterglow region of the plasma, the deposition rate, porosity of the resulting film coating and porosity of the film coating, etc. can be predictably selected, and reliably reproduced.

Figure 2A:
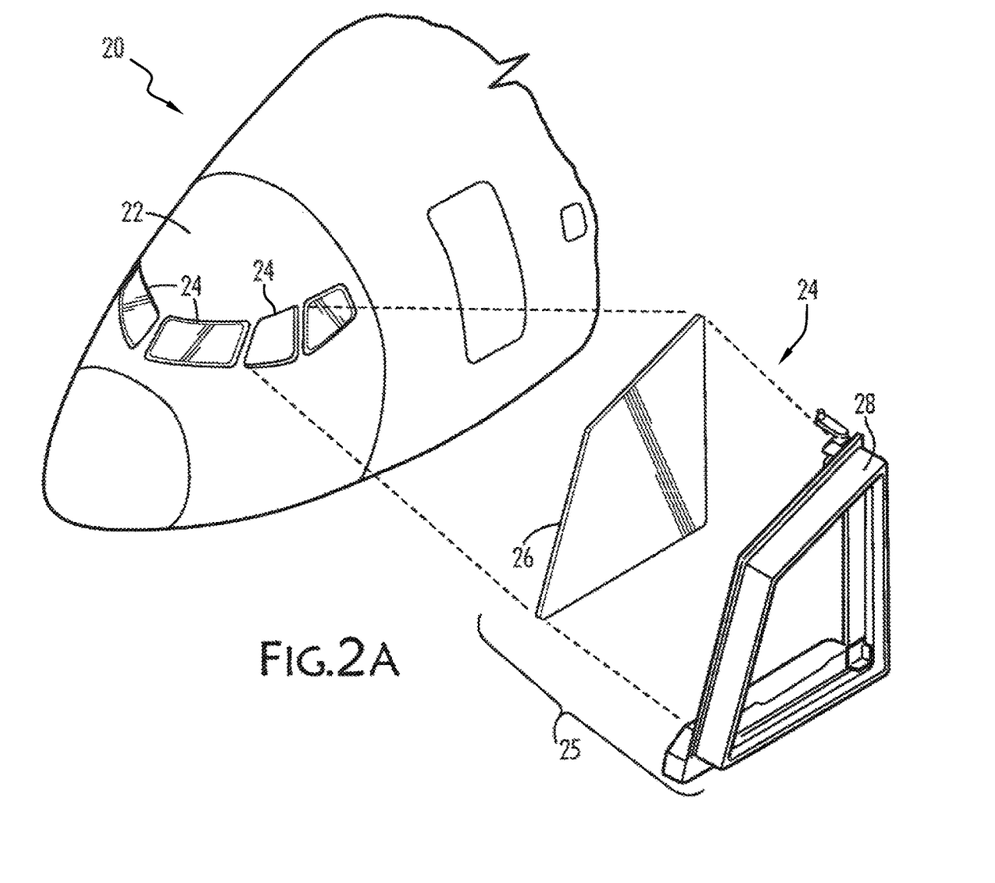
FIGS. 2A-2B and 3A-3B are perspective views of an aircraft showing features coated by apparatuses and methods that are aspects of the present disclosure.
Figure 2B:
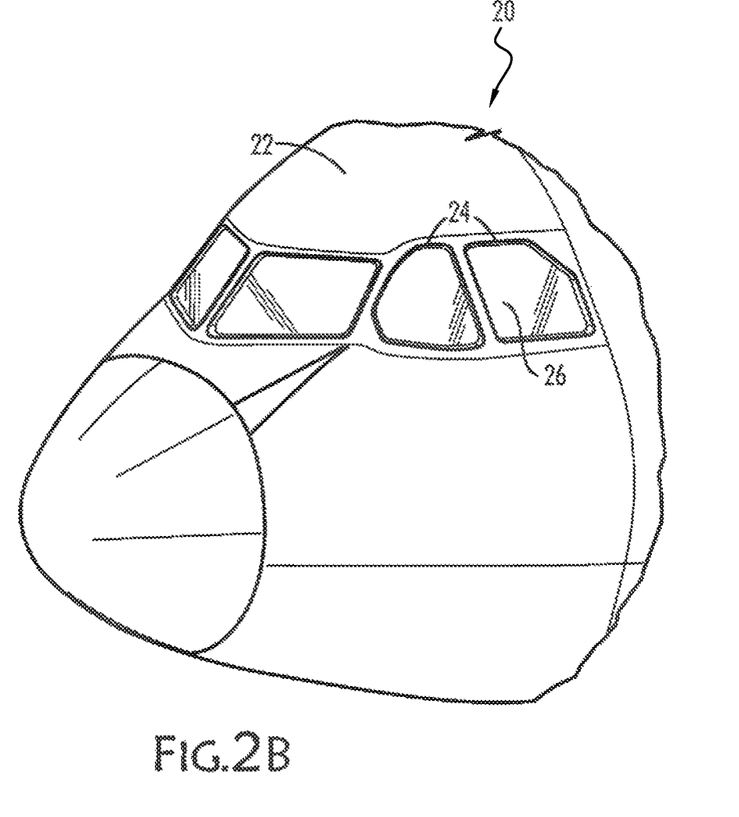

FIG. 2A shows the front portion of an aircraft, with an exploded view of a transparent cockpit window. As shown, aircraft 20 has cockpit section 22, with a plurality of cockpit window assemblies 24 that are transparent. Cockpit window assembly 24, comprises the transparent window 26 and a frame 28. According to aspects of the present disclosure, the window 26 may be coated according to the methods disclosed herein prior to the final window assembly into the cockpit section 22. In FIG. 2B the cockpit window assemblies are in place, and the windows 26 of the window assembly 24 may be treated while in place according to aspects of the present disclosure.

Figure 3A:
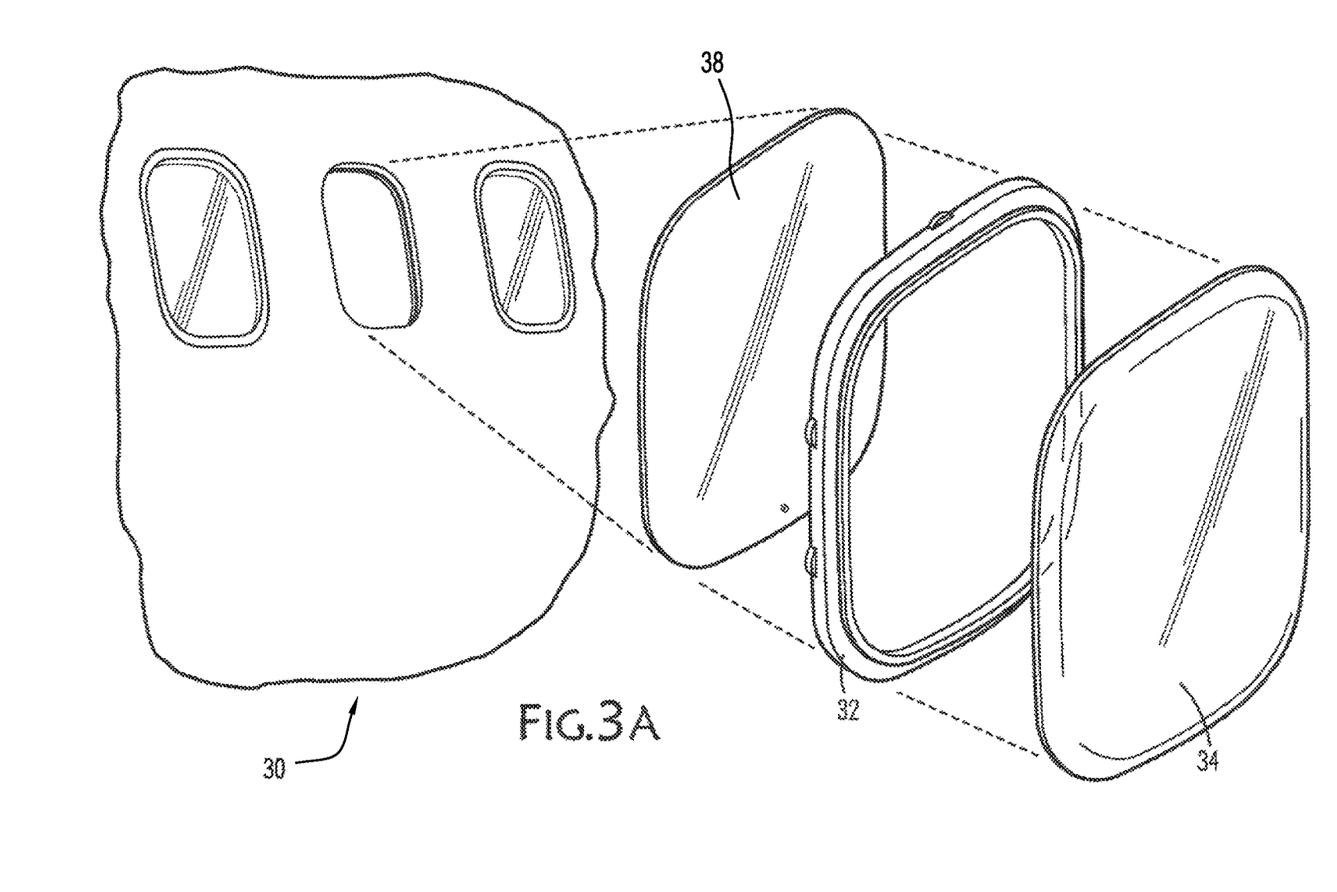
Figure 3B:
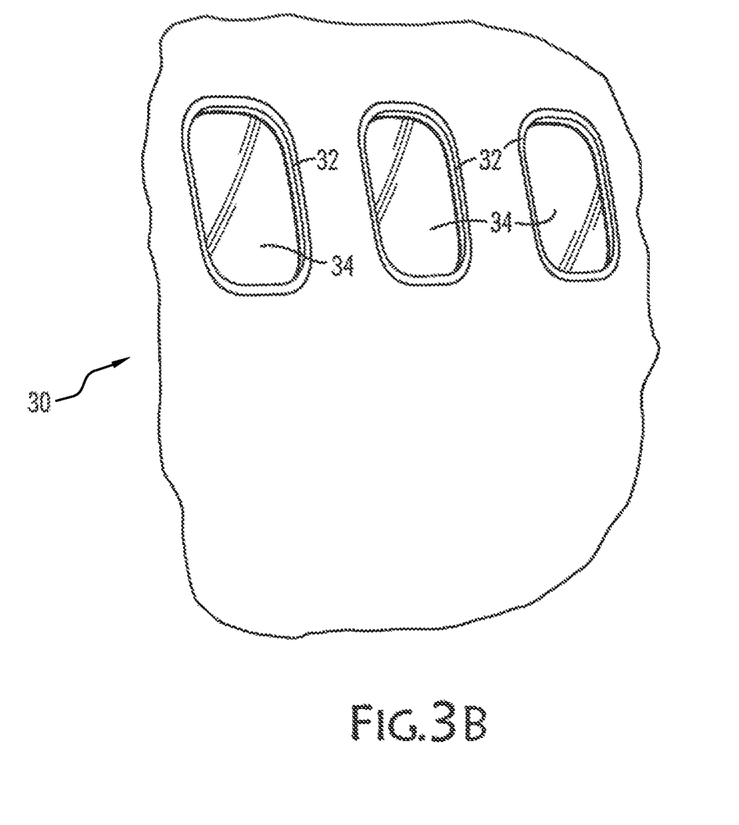

Similar to the transparent window assemblies shown in FIGS. 2A and 2B, the methods, systems and apparatuses according to aspects of the present disclosure may also be used to, for example, coat the transparent passenger windows of an aircraft. As shown in FIG. 3A, a section of an aircraft 30 shows an exploded view of a passenger window assembly 32 comprising exterior passenger window 34, passenger window frame 36 and interior passenger window 38. Exterior passenger window 34 may be coated according to atmospheric pressure plasma methods, systems and apparatuses disclosed herein, prior to installation as shown in FIG. 3A. In addition, passenger windows in an aircraft may also be coated according to aspects of the present disclosure after their installation. FIG. 3B shows a section of an aircraft 30 having passenger window assemblies 32 with exterior passenger window 34 visible and coated according to aspects of the present disclosure.

Figure 4:
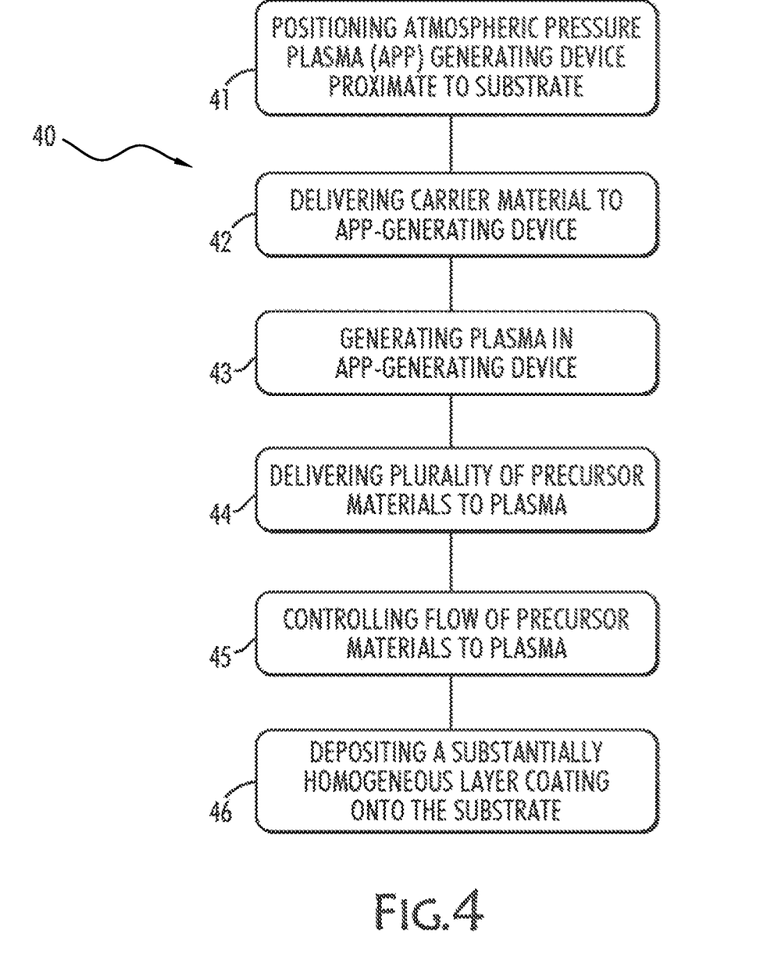
FIGS. 4-5 are flow charts outlining methods according to aspects of the present disclosure.
Figure 5:
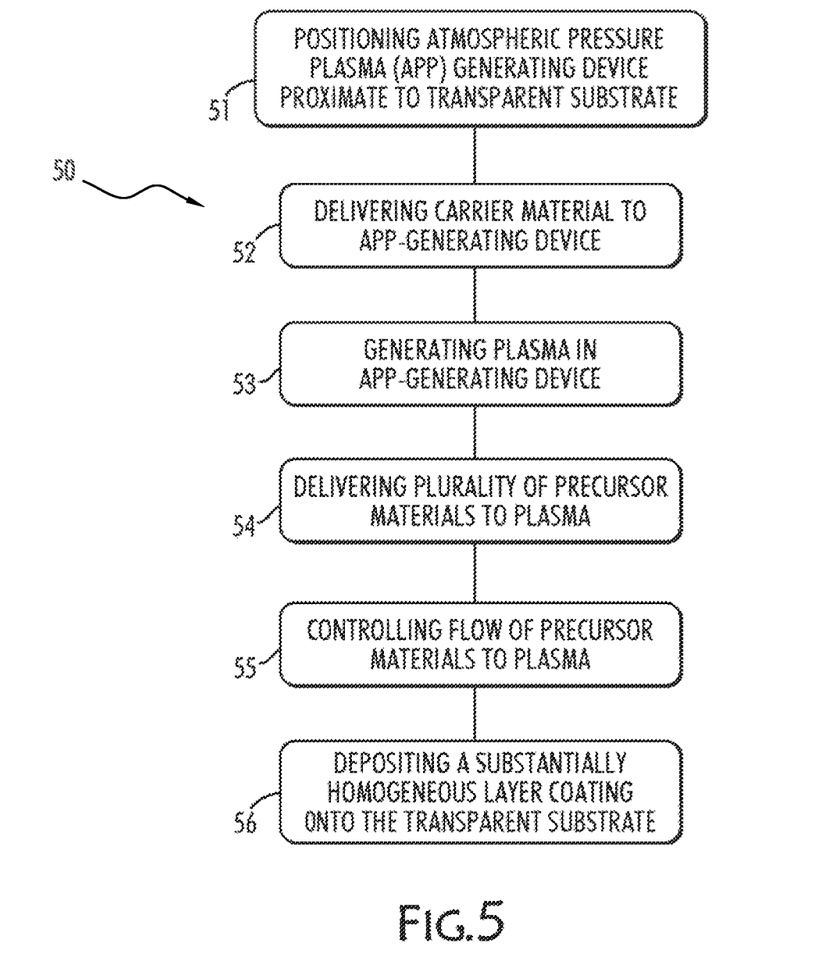

FIGS. 4 and 5 are flow charts showing contemplated variations according to the present disclosure. According to FIG. 4, a method for depositing a thin film onto a substrate 40 is outlined comprising: positioning atmospheric pressure plasma (APP) generating device proximate to a substrate 41; delivering carrier material to the APP-generating device 42; generating plasma in the APP-generating device 43; independently delivering a plurality of precursor materials to the plasma 44; controlling the flow of precursor materials to the plasma 45; and depositing a substantially homogeneous layer coating onto the substrate 46.

According to FIG. 5, a method for depositing a thin film onto a substantially transparent substrate 50 is outlined comprising: positioning atmospheric pressure plasma (APP) generating device proximate to a transparent substrate 51; delivering carrier material to the APP-generating device 52; generating plasma in the APP-generating device 53; independently delivering a plurality of precursor materials to the plasma 54; controlling the flow of precursor materials to the plasma 55; and depositing a substantially homogeneous layer coating onto the transparent substrate 56.

Figure 6:
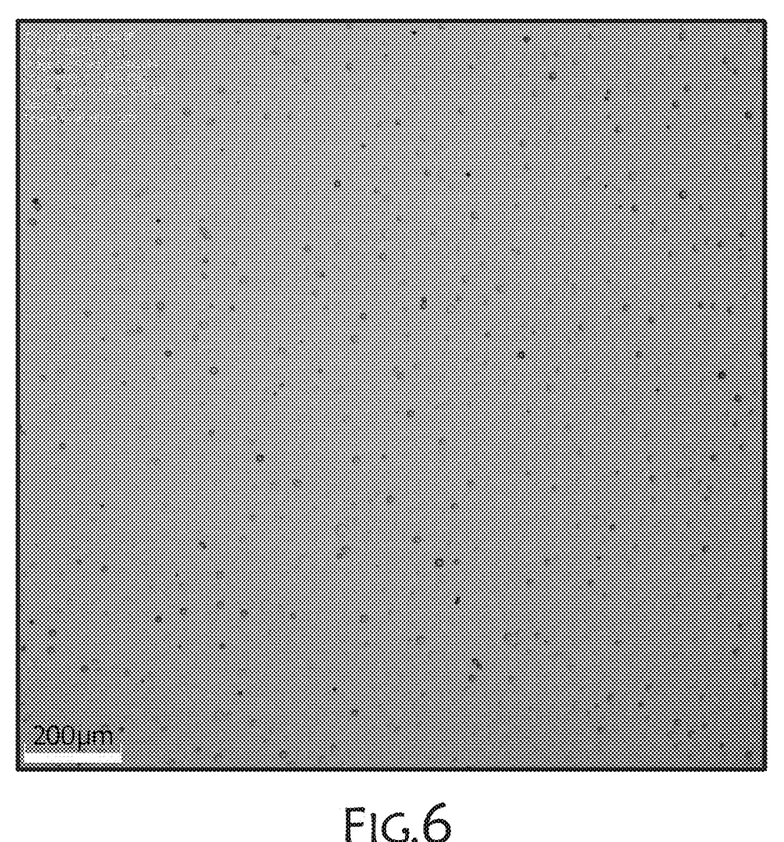
FIGS. 6-8 are representative drawings of SEM photographs of resulting multilayer films made by providing OMCTS and/or TMCTS to a carrier gas and depositing the films onto a substrate.
Figure 7:
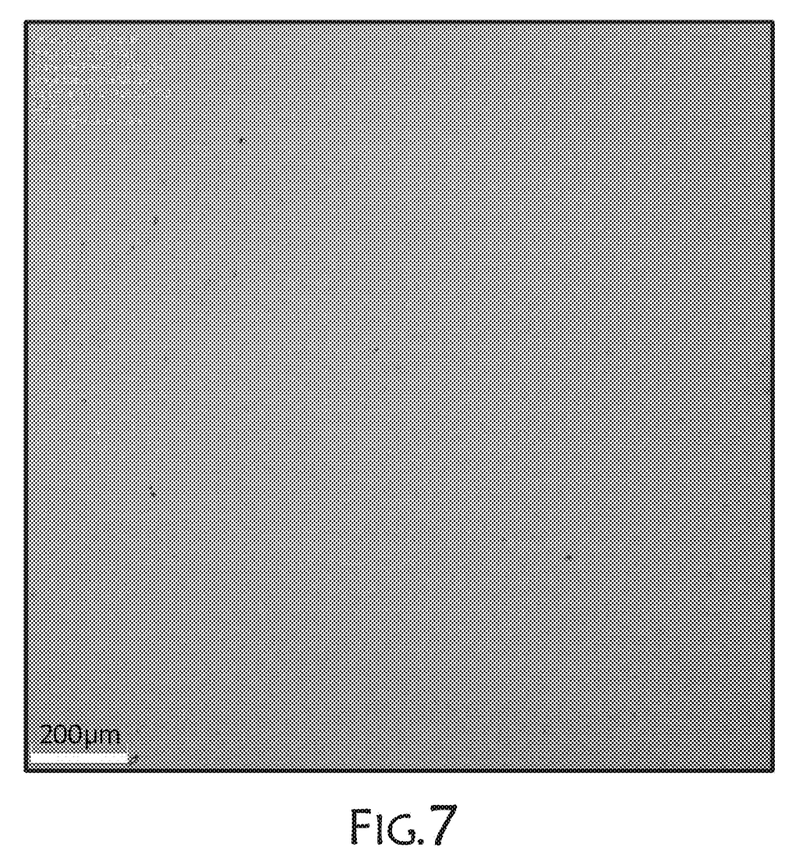
Figure 8:
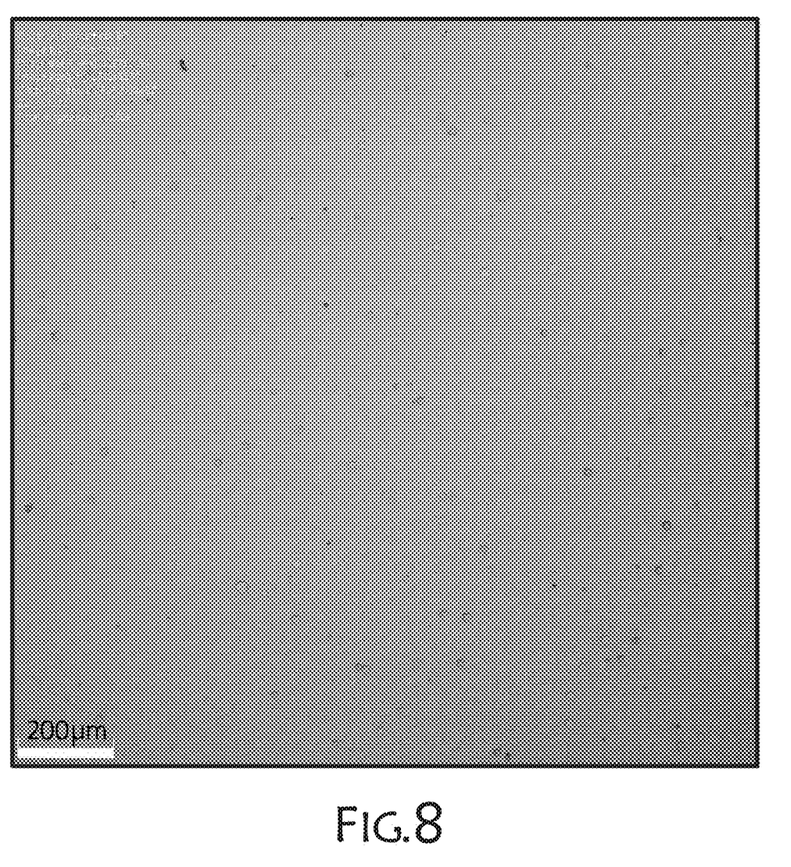

FIGS. 6-8 are 10× photographs of resulting single layer or multilayer films made by providing OMCTS and/or TMCTS to a carrier gas and depositing the films onto a substrate. FIGS. 6-8 are provided as comparative Examples to the single layer deposition methods and resultant films (having a plurality of precursors provided to the plasma) according to aspects of the present disclosure.

FIG. 6 is a 10× photograph of a 4 layer plasma coating (~500 nm thickness) comprising tetramethylcyclotetrasiloxane (TMCTS) as a precursor material in a plasma gas, with the coating applied as an atmospheric pressure plasma coating. Pinholes are clearly visible at magnification. While the surface of the coating was deemed adequate relative to erosion and abrasion resistance, the clearly visible pinholes provided sites for chemical or water attack.

FIG. 7 is a 10× photograph of a 4 layer plasma coating (~60 nm thickness) comprising octamethylcyclotetrasiloxane (OMCTS) as a precursor material in a plasma gas, with the coating applied as an atmospheric pressure plasma coating. While fewer pinholes are visible at magnification, and surface had improved overall smoothness (evidenced by the absence of pinholes), this thin film (~60 nm) was determined to be inadequate for abrasion and erosion resistance.

FIG. 8 is a 10× magnification photograph of a combination film plasma coating of 1 layer of octamethylcyclotetrasiloxane (OMCTS)-doped plasma deposited onto 2 layers of a tetramethylcyclotetrasiloxane (TMCTS)-doped plasma. The coatings were applied as an atmospheric pressure plasma coating. While fewer pinholes are visible, at 10× magnification shown, this film was determined to be inadequate for abrasion and erosion resistance.

Comparative Example 1

A thin film comprising one siloxane-containing precursor was produced according to atmospheric pressure plasma techniques.

The experiment process that produced the TMCTS film: The system consists of an Atomflo 500, a precursor delivery system made by Surfx Technologies, a x-y-z robot made by Fisnar, TMCTS provided by Gelest. The image of the film was taken by a microscope from Olympus Corporation, model DSX-CB. The coating condition was:

| Precursor | Bubbler Flow Rate (LPM) | Dilution Flow Rate (LPM) | Temp. (° C.) | Step Distance (mm) | Height (mm) | Speed (mm/s) | Number of Layers | Z value (in robot program) |
|---|---|---|---|---|---|---|---|---|
| TMCTS | 0.5 | 1.5 | 15 | 0.3 | 3 | 50 | 4 | 45 |

The resulting 4 layer film is shown as FIG. 6. The resulting film was approximately 500 nm thick. While the film displayed good erosion and abrasion resistance, undesirable pin holes were evident that could allow chemicals and water to adhere and adversely affect the coating.

Comparative Example 2

The same system set forth in Example 1 was used to produce OMCTS film. The process condition was:

| Precursor | Bubbler Flow Rate (LPM) | Dilution Flow Rate (LPM) | Temp. (° C.) | Step Distance (mm) | Height (mm) | Speed (mm/s) | Number of Layers | Z value (in robot program) |
|---|---|---|---|---|---|---|---|---|
| OMCTS | 0.7 | 1.5 | 35° C. | 0.3 mm | 3 mm | 50 mm/s | 4 | 45 |

The imaging used was the same instrument as described in Example 1. The resulting 4 layer film is shown in FIG. 7 as producing a very smooth surface (very few pinholes). However at only 60 nm, this material was believed to not produce adequate erosion or abrasion resistance in the absence of depositing more layers.

Comparative Example 3

The film of both OMCTS and TMCTS were co-deposited using the same technique and equipment set forth in Examples 1 and 2. The process condition was as follows: 2 layers of OMCTS were deposited using conditions in Example 2 to be followed by 2 layers of TMCTS of condition in Example 1. Note that in this Example, the result film was a combination of 2 separate films applied sequentially. As shown in FIG. 8, pin holes (presumably from the TMCTS layer) are still evident.

Example 4

As compared with the approach of the protocols used in Comparative Examples 1-3, two precursor materials (OMCTS and TMCTS) are separately, each introduced into the atmospheric pressure plasma apparatus via separate inlets from separate precursor material sources. The precursor materials are introduced to the plasma produced in a region commonly referred to as the before glow. In this way the plasma is doped with both precursor materials, without the precursor materials having a chance to interact with each other prior to coming into contact with the plasma, and thus doping the plasma. The flow of precursor materials is regulated in a predetermined way such that, according to one aspect, the precursors contact the plasma substantially simultaneously. By having a plurality of siloxane precursor materials contact the plasma to dope the plasma substantially simultaneously, characteristics of the final plasma coating (e.g. the doped plasma coating) are predictably tuned to achieve a desired and predetermined resulting plasma deposited atmospheric pressure plasma coating that is deposited on a substrate as a single layer transparent coating comprising both precursors. Again, multiple precursors impact the plasma to achieve a desired and predetermined single film, or single layer coating having the desired characteristics (e.g. abrasion/erosion resistance with fewer pinholes observed, etc.) while also being transparent. The OMCTS and TMCTS precursors react with the plasma to generate a deposited film that is substantially homogeneous. For the purpose of the present application, the term "substantially homogeneous" refers to a distribution of observed characteristics that is viewed consistently across the entire film, and that the distribution of plasma that has reacted with the precursor materials is also consistent throughout the deposited film. The film may be deposited as a single layer transparent film. In another alternative, multiple transparent layers of siloxane doped plasma may be deposited, but the composition of the films is understood to be equivalent throughout the layers, with the characteristics of each layer being substantially similar to one another. According to a still further alternative, the precursor material flow for each precursor material may be adjusted and varied relative to each precursor material. In this aspect, the precursor materials are still provided via separate inlets to the atmospheric pressure plasma deposition device, and the precursor materials still contact the plasma substantially simultaneously. However, according to this aspect, the flow of each precursor material is adjusted to impart desired final characteristics to the resulting transparent deposited film.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects including, without limitation, bridge trusses, support columns, general construction object, etc. Further objects include, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, etc. and therefore include manned and unmanned aircraft, spacecraft, terrestrial, non-terrestrial, and even surface and sub-surface water-borne vehicles and objects.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method for depositing a thin film onto a substantially transparent substrate, the method comprising:
   positioning an atmospheric pressure plasma generating device proximate to a substrate;
   delivering a carrier material to the atmospheric pressure plasma generating device;
   generating a plasma in the atmospheric pressure plasma generating device;
   delivering a plurality of combined precursor materials to the atmospheric pressure plasma generating device to form a plasma doped with the combined precursor materials;
   controlling the flow of the plurality of combined precursor materials to the atmospheric pressure plasma generating device; and
   depositing at atmospheric pressure a substantially homogeneous and a substantially transparent single layer coating onto the substrate.

2. The method of claim 1, wherein, in the step of delivering a plurality of precursor materials to the atmospheric pressure plasma generating device, the plurality of precursor materials are first combined and then delivered to the plasma are delivered to the plasma substantially simultaneously.

3. The method of claim 1, wherein, in the step of delivering a plurality of precursor materials to the atmospheric pressure plasma generating device, the plurality of precursor materials are delivered to the atmospheric plasma generating device independently from one another.

4. The method of claim 1, wherein, in the step of delivering a carrier material to the atmospheric pressure plasma generating device, the carrier material delivered comprises helium, argon, oxygen, nitrogen, hydrogen or combinations thereof.

5. The method of claim 1, wherein, in the step of delivering a plurality of precursor materials to the atmospheric pressure plasma generating device, the precursor materials delivered comprise siloxane-containing materials.

6. The method of claim 1, wherein, in the step of delivering a plurality of precursor materials to the atmospheric pressure plasma generating device, the precursor materials delivered comprise a material selected from the group consisting of: hexamethyldisiloxane; diethoxydiethylsilane; glycidoxypropyl trimethoxysilane; tetraethoxysilane; triethoxyvinylsilane; hexamethyltrisiloxane; octamethylcyclotetrasiloxane; tetramethylcyclotetrasiloxane; hexamethyldisilane; hexamethyldisilazane; methyltriethoxysilane; methyltrimethoxysilane; tetraethylorthosilane; 3-mercaptopropylytriethoxysilane; vinyltris(2-methoxyethoxyl)-silane; allyltriethoxysilane; (3-glycidoxypropyl)-trimethoxysilane; acrylate-containing compounds, copolymers thereof, and combinations thereof.

7. The method of claim 1, wherein, in the step of delivering a plurality of precursor materials delivered to the atmospheric pressure plasma generating device, the precursor materials delivered comprise: octamethylcyclotetrasiloxane and tetramethylcyclotetrasiloxane.

* * * * *